(12) United States Patent
Chen

(10) Patent No.: US 11,606,367 B2
(45) Date of Patent: Mar. 14, 2023

(54) SYSTEMS AND METHODS FOR NETWORK ANOMALY DETECTION AND RESOLUTION

(71) Applicant: PAYPAL, INC., San Jose, CA (US)

(72) Inventor: Zhe Chen, Singapore (SG)

(73) Assignee: PAYPAL, INC., San Jose, CA (US)

( * ) Notice: Subject to any disclaimer, the term of this patent is extended or adjusted under 35 U.S.C. 154(b) by 553 days.

(21) Appl. No.: 16/600,221

(22) Filed: Oct. 11, 2019

(65) Prior Publication Data

US 2021/0112080 A1    Apr. 15, 2021

(51) Int. Cl.
*H04L 9/40* (2022.01)
*G06N 3/04* (2006.01)

(52) U.S. Cl.
CPC ....... *H04L 63/1416* (2013.01); *G06N 3/0454* (2013.01)

(58) Field of Classification Search
CPC ........ G06N 3/0454; G06N 3/08; G06N 7/005; H04L 63/1416; H04L 63/1425; H04L 63/1483; H04L 67/02
See application file for complete search history.

(56) References Cited

U.S. PATENT DOCUMENTS

| | | | |
|---|---|---|---|
| 2017/0099311 A1* | 4/2017 | Kesin | H04L 63/12 |
| 2018/0219888 A1* | 8/2018 | Apostolopoulos | H04L 63/1425 |
| 2018/0332064 A1* | 11/2018 | Harris | H04L 63/1425 |
| 2019/0081959 A1* | 3/2019 | Yadav | H04L 63/1425 |
| 2019/0158520 A1* | 5/2019 | DiValentin | H04L 63/145 |
| 2020/0104426 A1* | 4/2020 | Wu | G06N 20/00 |
| 2020/0285944 A1* | 9/2020 | Lee | G06N 3/0472 |
| 2021/0014124 A1* | 1/2021 | Rossi | H04L 41/082 |

* cited by examiner

*Primary Examiner* — Daniel B Potratz
*Assistant Examiner* — Matthias Habtegeorgis
(74) *Attorney, Agent, or Firm* — Haynes and Boone, LLP

(57) ABSTRACT

Systems and methods for detecting network anomalies are described. These may include determining burst scores for external network resources, determining burst scores for internal network resources, and using the burst scores to construct a burst graph where the edges are weighted by the number of connections between each resource. The graph is then analyzed by a graph convolutional neural network to identify patterns from which anomalous network traffic can be detected and from which corrective action can be taken. These techniques can allow for better detection and mitigation of abusive network traffic, improve computer network security, and provide more robust access to networked computer resources.

20 Claims, 6 Drawing Sheets

SYSTEMS AND METHODS FOR NETWORK ANOMALY DETECTION AND RESOLUTION

FIELD OF INVENTION

The present specification generally relates to process automation based on machine learning, and more specifically, to detecting anomalous network traffic using neural networks according to various embodiments of the disclosure.

BACKGROUND

Applicant recognizes that service providers that offer a platform for conducting electronic transactions may be subjected to anomalous network traffic patterns. Most attacks of a computer network involve traffic interactions, and anomalous traffic patterns may correspond to potentially malicious actions. However, existing detection models cannot capture real traffic interactions on a dynamic network and thus perform poorly on complex attacks such as many Cross Site Scripting (XSS) attacks, especially with regards to false positives. There is therefore a need for improved network anomaly detection for detecting malicious users and fraudulent transactions.

Figure 1:
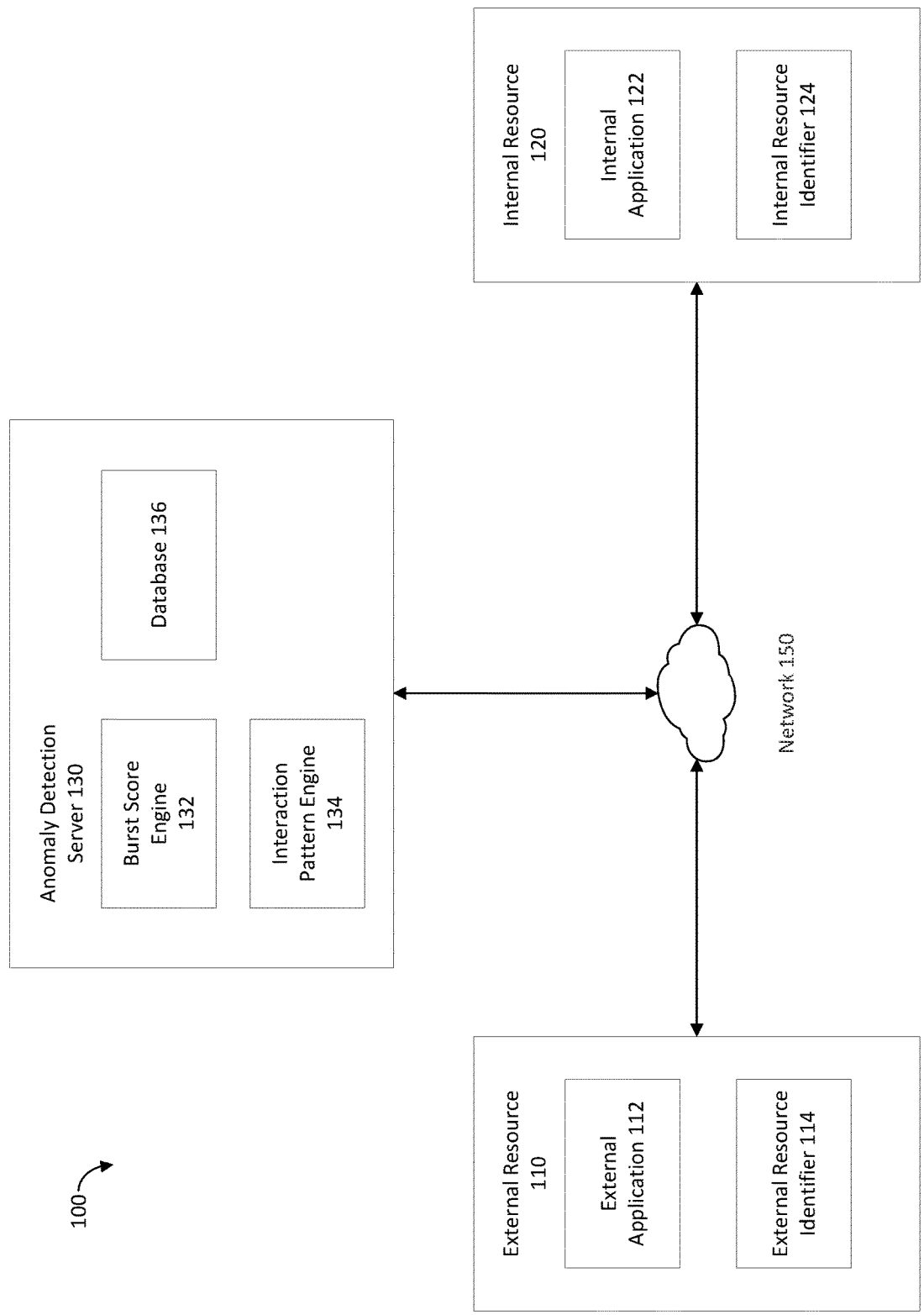
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for using machine learning with a graph convolutional neural network to detect anomalous network traffic, according to various embodiments. While some methods for network anomaly detection focus on discovering repeated and consistent patterns, certain attacks are difficult to detect using such techniques in a dynamic network without also causing false positives, such as those that may arise from a XSS attack. For example, Content Security Policies (CSP) can control where resources can be loaded from, preventing users from loading data into their browsers from unauthorized or unknown locations. While these policies can be used to find and block malicious code, such a technique is prone to false positives, as CSPs may classify legitimate browser add-ons such as spell checking and grammar checking tools (e.g., as provided by Grammarly™) as false positives. By analyzing the patterns in network traffic, the improved detection from methods described herein is not only an improvement on pattern detection techniques, it does not require any prior knowledge about the signature of a potential attack. That is, anomalous network patterns can be detected that may indicate an attack, even if the attack is of an unknown type.

According to various embodiments of the disclosure, an anomaly detection system may adopt a machine learning approach to improve accuracy in detecting anomalous network traffic. In some embodiments, the anomaly detection system may determine burst scores for external network resources, such as an external IP address or domain, and internal network resources, such as an internal server or service. For example, an external burst score may be determined for an external domain based on the traffic interactions between the domain and each of one or more internal servers. An internal burst score may be determined for an internal server based on the traffic interactions with that internal server from each of one or more external domains. The anomaly detection system may then create a burst graph based on the external burst score and the internal burst score. By using a graph convolutional neural network, the system may determine an interaction pattern of normal traffic with which to compare traffic in subsequent time windows. Based on the interaction pattern and traffic interactions in subsequent time windows, the system may determine an anomalous traffic event based on a deviation of the interaction pattern from a probability density function.

FIG. 1 illustrates a network monitoring system 100, within which the profile matching system may be implemented according to one embodiment of the disclosure. The network monitoring system 100 includes an internal network resource 120, an anomaly detection server 130, and an external network resource 110 that may be communicatively coupled with each other via a network 150. The network 150, in one embodiment, may be implemented as a single network or a combination of multiple networks. For example, in various embodiments, the network 150 may include the Internet and/or one or more intranets, landline networks, wireless networks, and/or other appropriate types of communication networks. In another example, the network 150 may comprise a wireless telecommunications network (e.g., cellular phone network) adapted to communicate with other communication networks, such as the Internet.

The external network resource 110, in one embodiment, may be utilized by a user to interact with the internal network resource 120 over the network 150. For example, the user may use the external network resource 110 to conduct an online purchase transaction with the internal network resource 120 via a website hosted by the internal network resource 120, a mobile application associated with the internal network resource 120, or a point-of-sale (POS) system associated with the internal network resource 120. The external network resource 110, in various embodiments, may be implemented using any appropriate combination of hardware and/or software configured for wired and/or wireless communication over the network 150. In various implementations, the external network resource 110 may include at least one of a wireless cellular phone, wearable computing device, PC, laptop, etc.

The external network resource 110, in one embodiment, includes an external application 112 (e.g., a web browser, a mobile payment application, etc.), which may be utilized by the user to conduct electronic transactions (e.g., online payment transactions, etc.) with the internal network resource 120 over the network 150. The external network resource 110 may also include at least one external resource identifier 114, which may be implemented, for example, as an IP address, operating system registry entries, cookies associated with the external application 112, identifiers associated with hardware of the external network resource 110 (e.g., a media control access (MAC) address), network domain information, and/or various other appropriate identifiers.

Even though only one external network resource 110 is shown in FIG. 1, it has been contemplated that one or more external network resources (each similar to external network resource 110) may be communicatively coupled with an internal network resource 120 and/or the anomaly detection server via the network 150 within the system 100.

The internal network resource 120, in various embodiments, may be maintained by an operating entity (or in some cases, by a partner of an operating entity that processes transactions on behalf of the operating entity). Examples of operating entities include but are not limited to merchant sites, resource information sites, utility sites, real estate management sites, social networking sites, etc., which offer various services accessible over the network 150.

Even though only one internal network resource 120 is shown in FIG. 1, it has been contemplated that one or more internal network resources (each similar to internal network resource 120) may be accessible to one or more external network resources 110 and/or the anomaly detection server 130 via the network 150 within the system 100.

The internal network resource 120, in one embodiment, may include an internal application 122, which may be configured to provide information over the network 150 to the external application 112 of the external network resource 110. For example, the user of the external network resource 110 may interact with the internal application 122 through the external application 112 over the network 150 to request information, conduct a commercial transaction, or otherwise interact with the internal application 122. The internal network resource 120, in one embodiment, may include at least one internal resource identifier 124, which may identify the internal resource 120 or internal application 122 being accessed by the external application 112. In one implementation, the internal resource identifier 124 may include a server identifier (e.g. hostname, IP address), application identifier (e.g., URL, application name), and/or other identifier that identifies an internal network resource 120. The internal resource identifier 124 may include attributes related to the internal network resource 120, such as identification information (e.g., a serial number, a location address, GPS coordinates, a network identification number, etc.).

The anomaly detection server 130, in one embodiment, may be maintained by a transaction processing entity, an online service provider, or another operating entity, which may provide network monitoring services for interactions of the external network resource 110 and the internal network resource 120. As such, the anomaly detection server 130 may include a burst score engine 132 which may be adapted to interact with the external network resource 110 and/or the internal network resource 120 over the network 150 to facilitate the anomaly detection services offered by the anomaly detection server 130. In one example, the anomaly detection server 130 may be provided by PayPal®, Inc., of San Jose, Calif., USA, and/or one or more service entities or a respective intermediary that may provide multiple point of sale devices at various locations to facilitate transaction routings between users such as merchants and, for example, service entities.

The anomaly detection server 130 may also include an interaction pattern engine 134 that is configured to process data from the burst score engine 132 to detect anomalous network traffic. For example, the burst score engine 132 may take data gathered from external network resources and internal network resources to determine burst scores. In another example, the interaction pattern engine 134 may an interface to the burst score engine 132 to process the burst score data to detect anomalous network traffic. Burst score engine 132 and interaction pattern engine 134 may be implemented as executable computer instructions stored on a computer-readable medium.

The anomaly detection server 130, in one embodiment, may be configured to maintain data needed by the burst score engine 132 and the interaction pattern engine 134 in database 136 to the dynamic interaction patterns over time. For example, the database 136 may include historical network traffic data and store output from the burst score engine 132 and the interaction pattern engine 134. In certain embodiments, the database may also be used to store information for identifying the type of anomalous network traffic (such as a denial of service attack, CSS attack, etc.). Database 136 may also include multiple databases, in various embodiments.

Figure 2:
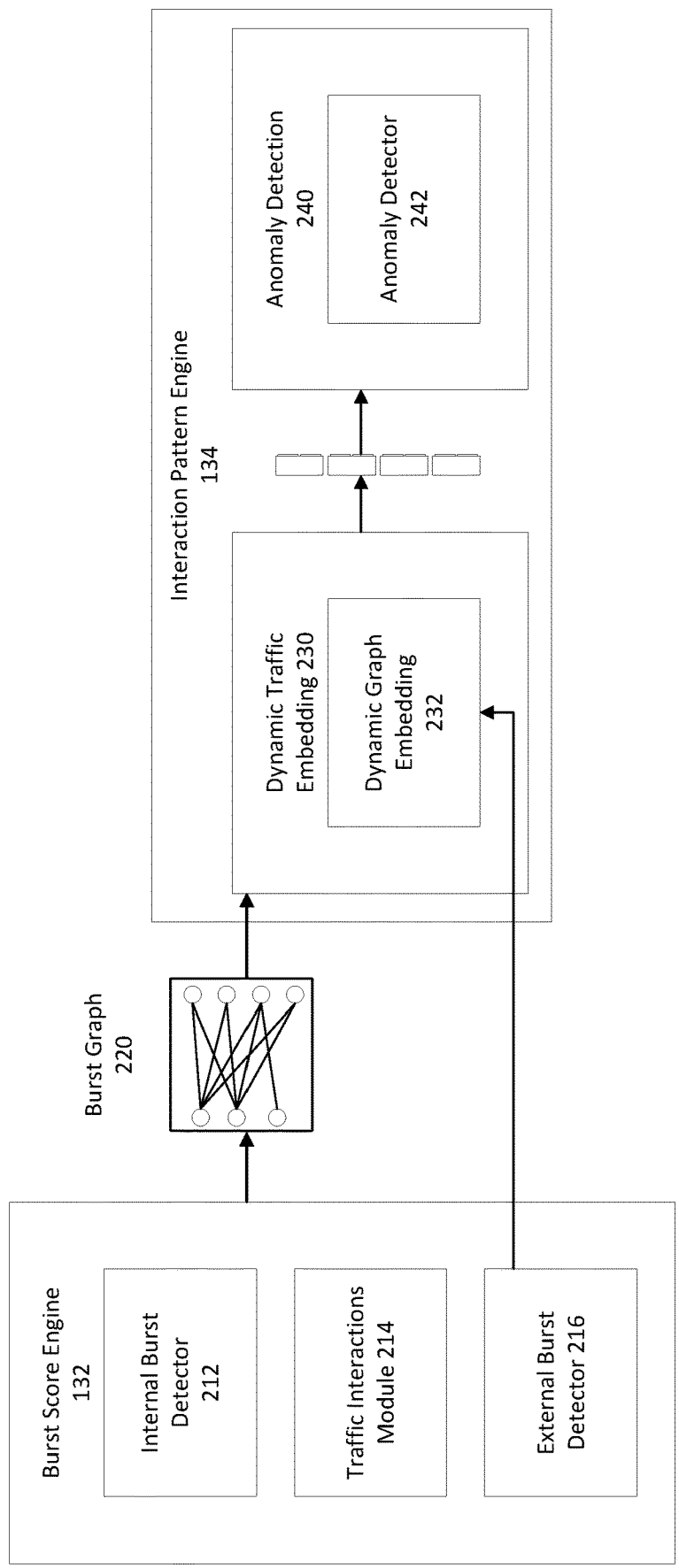
FIG. 2 is a block diagram illustrating a profile matching module according to an embodiment of the present disclosure.

FIG. 2 illustrates a block diagram of the anomaly detection server 130 according to an embodiment of the disclosure. The anomaly detection server 130 may include an internal burst detector 212, a traffic interactions module 214, and an external burst detector 216. The traffic interactions module 214 may collect information regarding interactions between the external network resources 110 and the internal network resource 120. The internal burst detector 212 may use information gathered from the internal network resource 120 and the traffic interactions module 214 to determine an internal burst score for the internal network resource. The external burst detector 216 may use information gathered from the internal network resource 120 and the traffic interactions module 214 to determine an internal burst score for the internal network resource. In some embodiments, the burst score engine 132 generates a burst graph 220 comprising a weighted bipartite graph comprising a set of nodes for internal network resources, a set of nodes for external resources, and a weighted edge between each node from the set of nodes for internal network resources and each node from the set of nodes for external network resources. The burst graph 220 data may be based on the internal burst score determined by the internal burst detector 212 and the external burst score determined by the external burst detector 216.

In an embodiment, the anomaly detection server may include an interaction pattern engine 134. The interaction pattern engine 134 may use the burst graph 220 to determine the embedding for each external network resource 110 and internal network resource 120. For example, the interaction pattern engine may perform dynamic traffic embedding 230 by using a method for dynamic graph embedding 232 to generate an interaction graph, as detailed below in step 408. The interaction pattern may also perform anomaly detection 240 using an anomaly detector 242, such as the gaussian mixture model described in step 410 below.

Figure 3:
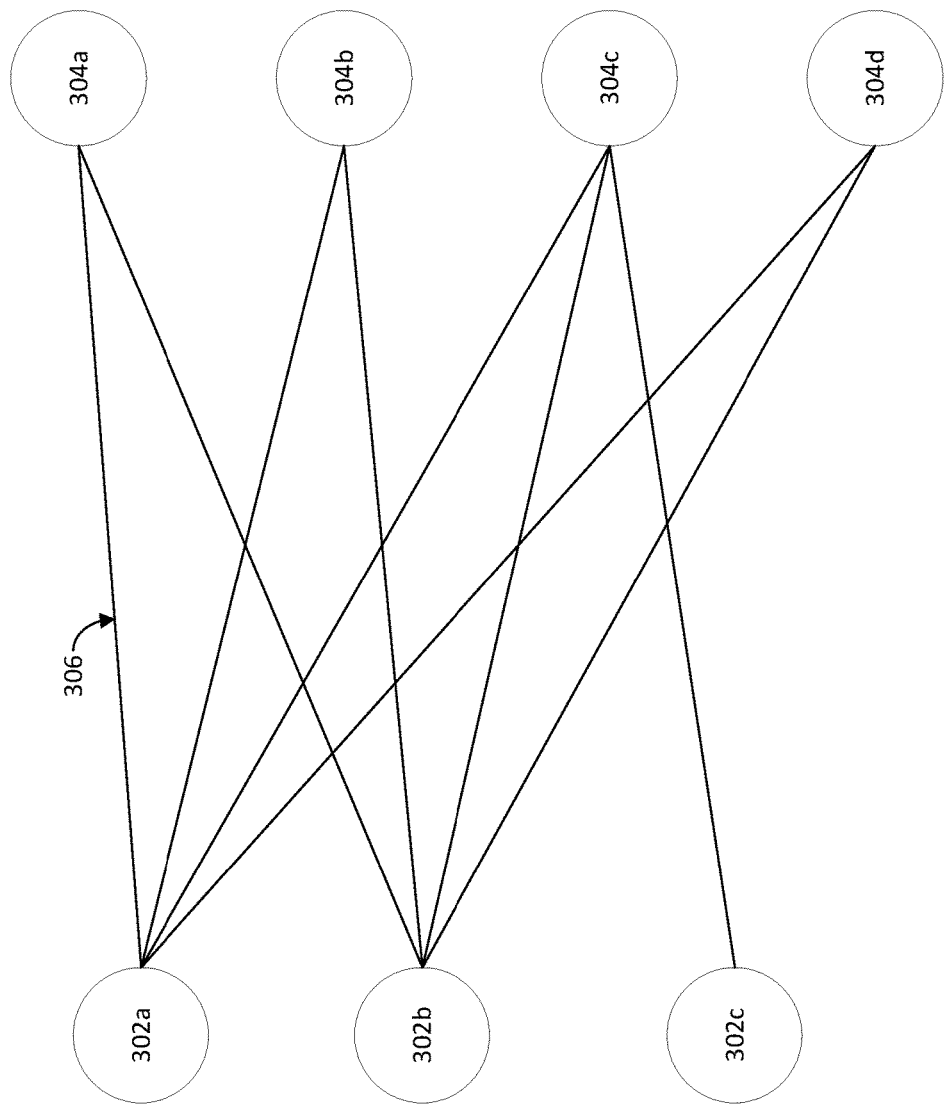
FIG. 3 is a block diagram illustrating a burst graph according to an embodiment of the present disclosure.

FIG. 3 illustrates a block diagram for a graphical representation of an example burst graph 220. In some embodiments, the burst graph 220 may include nodes 302a, 302b, and 302c (also referred to as nodes 302a-c) representing external network resources and may include nodes 304a, 304b, and 304c (also referred to as nodes 304a-d) representing internal network resources. The edges 306 of the burst graph represent the interactions between nodes 302a-c and nodes 304a-d. In the illustrated example, node 302a has interacted with nodes 304a-d, node 302b has interacted with nodes 304a-d, and node 302c has interacted with 304c. The weight of each edge 306 is based on the number of interactions between the two connected nodes and the burst score of the internal network resource, such as nodes 304a-d, according to various embodiments.

Figure 4:
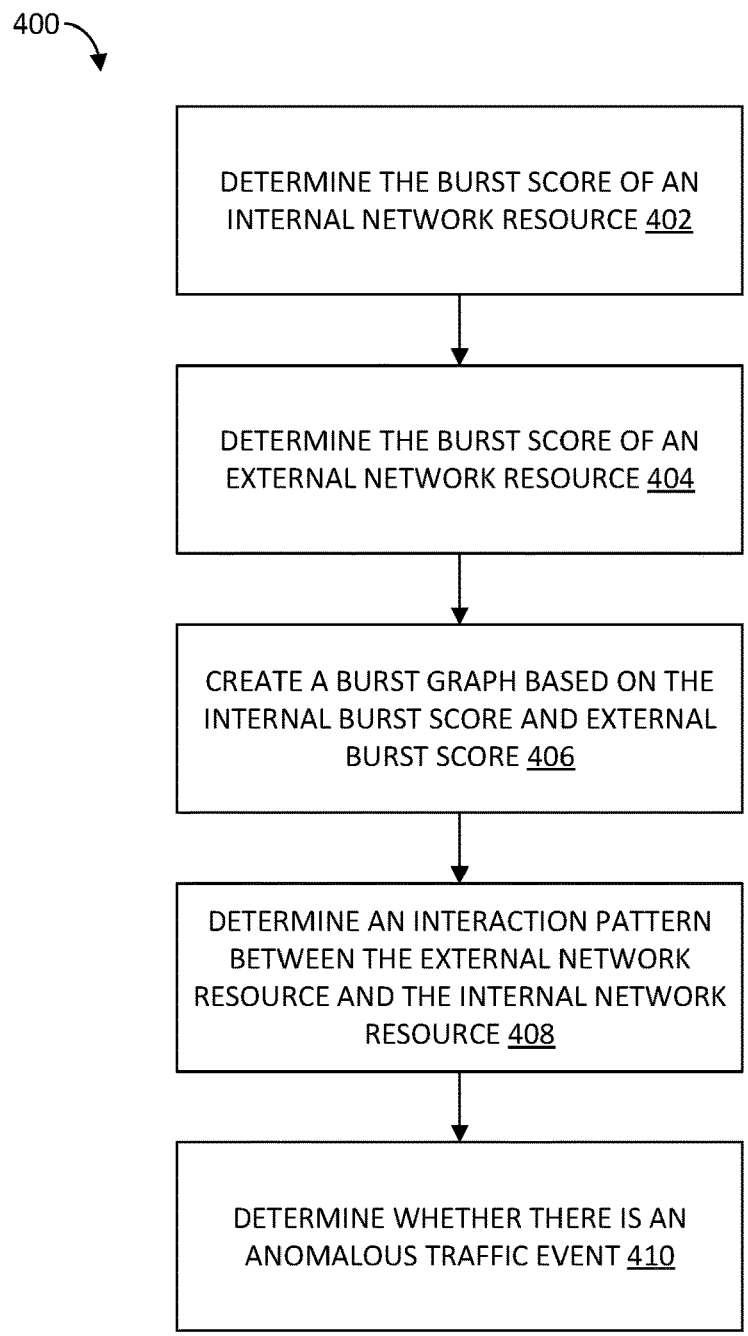
FIG. 4 is a flowchart showing a process of detecting anomalous network traffic according to an embodiment of the present disclosure.

FIG. 4 illustrates a process 400 for detecting anomalous network traffic according to one embodiment. In some embodiments, anomaly detection server 130 provides network traffic information to the burst score engine 132 to generate a weighted bipartite graph comprising a set of nodes for internal network resources, a set of nodes for external resources, and a weighted edge between each node from the set of nodes for internal network resources and each node from the set of nodes for external network resources. The interaction pattern engine 134 may use the weighted bipartite graph to determine the dynamic interaction pattern embedding for each external network resource 110 and internal network resource 120. Anomalous network traffic may be determined by analyzing the dynamic interaction pattern embedding provided by the interaction pattern engine 134. According to various embodiments, one or more steps of process 400 may be performed by anomaly detection server 130. At step 402, burst score engine 132 determines the burst score for an internal network resource 120, according to various embodiments. In some embodiments, each internal network resource 120 may be modeled with two states M: a normal state (0) and a burst state (1). In each time window, an internal network resource state may be detected, and a burst score will be determined to indicate the degree the interaction frequency is abnormal compared to its usual interaction frequency. For example, the burst score engine may first determine:

$$p_r f(\Delta; \lambda) = \lambda e^{-\lambda \Delta}$$

$$p_r \begin{cases} f(\Delta_r, \lambda_0), & M = 0, \\ f(\Delta_r, \lambda_1), & M = 1 \end{cases}$$

where $f(\cdot)$ is the exponential distribution. $\Delta_r$ is the time interval between two adjacent traffic interactions to resource r. The $\lambda_0$ and $\lambda_1$ are the interaction rate parameters for r in its base state and burst state respectively. They can be easily obtained from observation with sampling. In real implementation, we may not directly observe the rate for r in its burst state. Instead, we can practically set $\lambda_1 = \alpha \lambda_0$, where $\alpha > 0$. We define $p_r$ as the probability of resource r obtaining two adjacent traffic interactions with time interval $\Delta_i$ and it can be drawn from exponential distribution $f(\cdot)$ with respect to state M.

Continuing with step 402, the probability of observing resource r with frequency $f_r$ may be modeled by binomial distribution:

$$P(f_r) = \binom{N^t}{f_r} p_r^{f_r} (1-p_r)^{N^t - f_r}$$

where $N^t$ denotes the number of traffic interactions within a time window and $f_r$ denotes the number of traffic interactions related to an internal network resource 120. As $N^t$ may be very large, the probability may, in some embodiments, be approximated by a Gaussian distribution:

$$P(f_r) \sim \mathcal{N}(N^t p_r, N^t p_r (1-p_r))$$

In some embodiments, the cost for an internal network resource r in state Q interacting with an external network resource time window t may be defined as:

$$\phi(m, r^t) = -\ln P(f_r)$$

using a state transition cost of:

$$\tau(r^t) \begin{cases} \gamma \ln f_r, & \text{From } m = 0 \text{ to } m = 1 \\ 0, & \text{Others} \end{cases}$$

$\tau(r^t)$ provides for a state transition cost of internal network resource r from base state to burst state that is proportional to the number of interactions of the internal network resource. There is no cost for internal network resource r to remain in its current state or to transition from a burst state to its base state.

Continuing with step 402, the burst score engine, for a sequence of time windows $\{t_1, t_2 \ldots t_n\}$ may attempt to find the state $\{m^{t_1}, m^{t_2} \ldots m^{t_n}\}$ for each resource r that minimizes the cost:

$$c(r^t) = \sum_{t=0}^{n} \phi(m, r^t) + \sum_{t=0}^{n} \tau(r^t)$$

In some embodiments, this can be solved in a greedy manner by assuming $m^{t_i}$ only depends on $m^{t_{i-1}}$ and is independent of previous states. In this case, $m^{t_i}$ can be predicted by:

$$\arg\min_m c(r^t) = \phi(m, r^t) + \tau(r^t)$$

The burst score engine may then calculate an internal burst score by determining:

$$\text{Cost}(r^t) = \phi(0, r^t) - \phi(1, r^t)$$

$$\text{Burst}(r^t) = \frac{e^{\text{Cost}(r^t)}}{\sum_{r^t \in R} e^{\text{Cost}(r^t)}}$$

This calculates the improvement in cost by using a burst state instead of a base state. In some embodiments, the burst score may be fed into a SoftMax function to map the improvement into a probability score.

At step 404, the burst score engine determines the burst score for an external network resource 110, according to various embodiments. In some embodiments, each external network resource may be modeled by comparing the traffic interactions for the external network resource 110 to other external network resources within the same time window. In some embodiments, the number of traffic interactions for the external network resource 110 is compared to the mean number of interactions of all external network resources for a time window, and a burst state is determined based on whether the number of traffic interactions exceeds a predetermined number of standard deviations from the mean. In some embodiments, the expected frequency for an external network resource d may be modeled with a Gaussian distribution:

$$P(f_{q^t}) \sim \mathcal{N}\left(\frac{N^t}{|Q|}, \frac{\Sigma_{q^t \in Q}\left(q^t - \frac{N^t}{|Q|}\right)^2}{|Q|}\right)$$

where Q is the set of external network resources within time window t. The expected frequency for the external network resource 110 would be $$E[Q \mid t] = \frac{N^t}{|Q|}.$$

Continuing step 404, in some embodiments, the burst score engine may calculate the burst score for the external network resource 110 by determining:

$$\text{Burst}(q^t) = S\left(10 * \frac{f_q^t - E[Q \mid t]}{2 * \sigma[Q \mid t]}\right)$$

where S( ) denotes a Sigmoid function.

At step 406, the burst score engine 132 creates a burst graph 220 based on the internal burst score and the external burst score, according to various embodiments. In some embodiments, the burst score engine 132 creates a bipartite burst graph with nodes for each external network resource and each internal network resource. In some examples, the burst score engine 132 generates the burst graph based on determining the weight of edges between external network resources 110 and internal network resources 120. For example, the weight of the edge may be determined by:

$$W(q^t, r^t) = n_{q^t, r^t} * \text{Burst}(r^t)$$

For example, the burst score engine 132 determines a burst score for an external network resource 110 and an internal network resource 120, according to steps 402 and 404, described above. The burst score engine 132 then creates a burst graph 220 comprising a node representing the external network resource 110 and a node representing the internal network resource 120. The nodes are connected by an edge representing the interactions between the external network resource 110 and the internal network resource 120 and weighted according to the formula described for step 406 above. The burst graph 220 comprises the nodes and edges calculated in steps 402, 404, and 406.

At step 408, the interaction pattern engine 134 uses the burst graph 220 to determine an interaction pattern for the traffic interactions of the external network resource 110, according to various embodiments. An interaction pattern comprises an embedded graph with representations for the magnitude with which the actual interactions between external network resources 110 and internal network resources 120 deviate from the expected interactions. In some embodiments, a graph convolutional neural network (e.g., GCN) may be used to generate embeddings for a previously unseen external network resource. As an example, GraphSage™ is a variant of GCN that may be used to generate a graph embedding.

Continuing step 408, the interaction pattern engine 134 determines the feature $h_q^0$ for each external network resource q by determining $\forall q \subset Q$ with the weighted edges with all internal network resources within a time window t, according to various embodiments. In interaction pattern engine 134 determines the feature $h_r^0$ for each internal network resource r by determining:

$$h_r^0 \leftarrow \text{mean}(h_q, \forall q \subset N_+(r))$$

where I(r) are the external network resources' interactions with internal network $z_r$, using an aggregation function taking the element-wise mean of the vectors in q, $\forall q \subset N_+(r)$. The interaction pattern engine 134 may aggregate the interaction patterns for all interacted external network resources. In some embodiments, the embedding of each internal network resource 120 is embedded in the space that captures the expected interaction patterns for the external network resources 110 that have interacted with it. The embedding may be generated by determining:

$$h_u \leftarrow \text{AGGREGATION}(h_v, \forall v \subset N_+(u))$$

$$h_u \leftarrow h_u / \|h_u\|_2;$$

$$z_u \leftarrow \sigma(W * h_u)$$

where u may be either an external network resource q or an internal network resource r. In some embodiments, each $z_q$ is assigned its own burst score: $z_q = \text{burst}(q) * z_q$, where burst (q) is the burst score for domain u calculated in step 404 above.

At step 410, the given the interaction pattern generated in step 408, in some embodiments, may be used by the interaction pattern engine to determine whether there is an anomalous traffic event. In some embodiments, an anomalous traffic event represents interactions between an external network resource 110 and an internal network resource 120 that deviate from the expected interactions and may represent malicious or fraudulent network traffic. In an example, a gaussian mixture model (GMM) may be used in the form of an estimation network to detect anomalous traffic by computing the probability density function of each sample being normal.

In an example, the GMM may assign a probability to each data point of being created by a node in the interaction pattern. If the probability for each node in the interaction pattern is less than a predetermined probability (e.g., p<0.05), then the data point may be identified as an outlier (i.e., anomalous network traffic). Specifically, GMM estimation networks may determine the probability of each data point being created by gaussian distributions, such as those created by steps 402 and 404 for each external network resource 110 and internal network resource 120.

Figure 5:
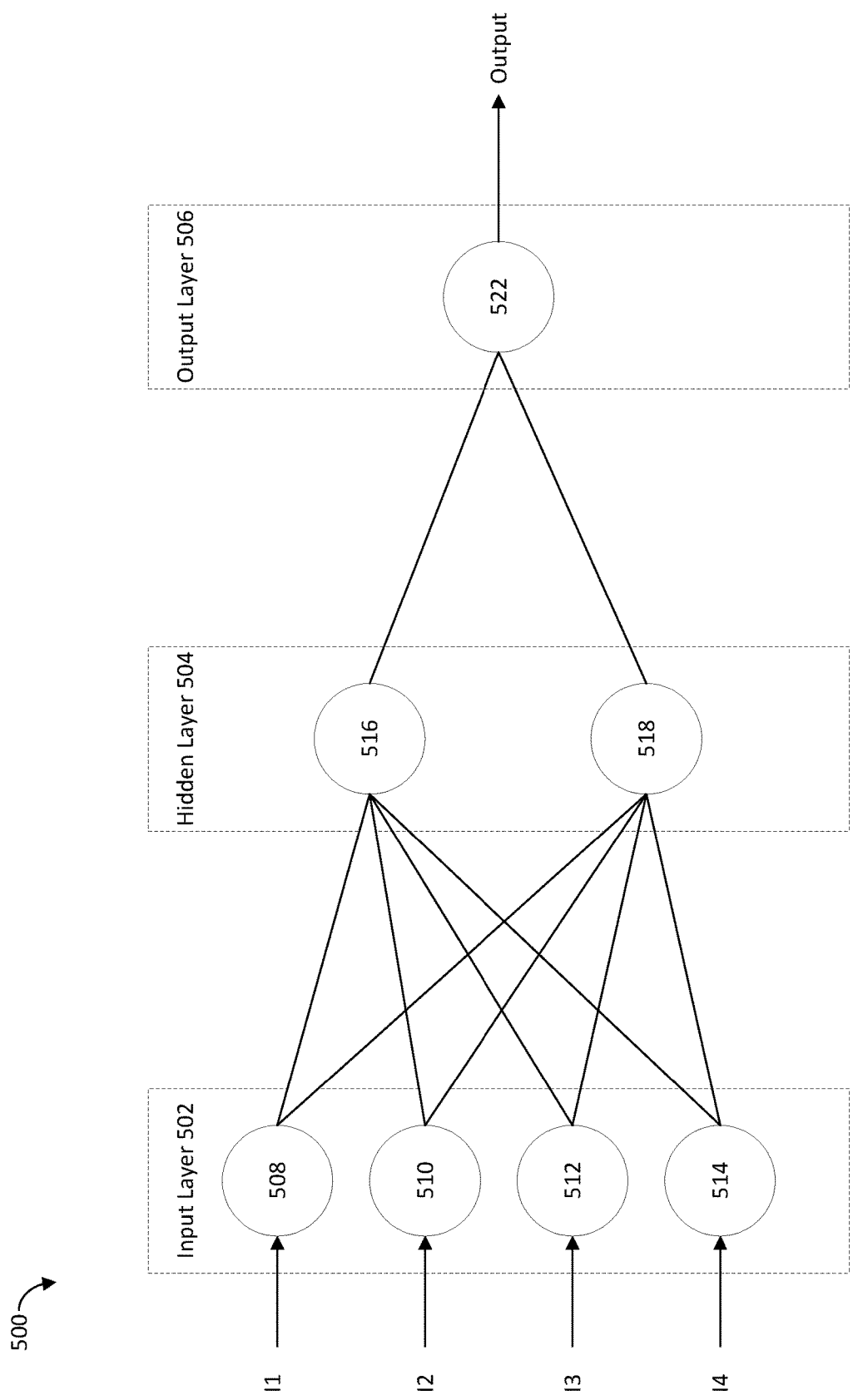
FIG. 5 illustrates an artificial neural network according to an embodiment of the present disclosure.

FIG. 5 illustrates an example artificial neural network 500 that may be used to implement the graph convolutional neural network discussed above relative to FIG. 4. As shown, the artificial neural network 500 includes three layers—an input layer 502, a hidden layer 504, and an output layer 506. Each of the layers 502, 504, and 506 may include one or more nodes. For example, the input layer 502 includes nodes 508-514, the hidden layer 504 includes nodes 516-518, and the output layer 506 includes a node 522. In this example, each node in a layer is connected to every node in an adjacent layer. For example, the node 508 in the input layer 502 is connected to both of the nodes 516-518 in the hidden layer 504. Similarly, the node 516 in the hidden layer is connected to all of the nodes 508-514 in the input layer 502 and the node 522 in the output layer 506. Although only one hidden layer is shown for the artificial neural network 500, it has been contemplated that the artificial neural network 500 used to implement the matching module 212 may include as many hidden layers as necessary.

In this example, the artificial neural network 500 receives a set of input values and produces an output value. Each node in the input layer 502 may correspond to a distinct input value. For example, when the artificial neural network 500 is used to implement the interaction pattern engine 134, each node in the input layer 502 may correspond to a distinct external network resource or internal network resource. In a non-limiting example, the node 508 may correspond to an IP address, the node 510 may correspond to an internal resource URL, the node 512 may correspond to an external domain, the node 514 may correspond an internal server.

In some embodiments, each of the nodes 516-518 in the hidden layer 504 generates a representation, which may include a mathematical computation (or algorithm) that produces a value based on the input values received from the nodes 508-514. The mathematical computation may include assigning different weights to each of the data values received from the nodes 508-514. The nodes 516 and 518 may include different algorithms and/or different weights assigned to the data variables from the nodes 508-514 such that each of the nodes 516-518 may produce a different value based on the same input values received from the nodes 508-514. In some embodiments, the weights that are initially assigned to the features (or input values) for each of the nodes 516-518 may be randomly generated (e.g., using a computer randomizer). The values generated by the nodes 516 and 518 may be used by the node 522 in the output layer 506 to produce an output value for the artificial neural network 500. When the artificial neural network 500 is used to implement the interaction pattern engine 134, the output value produced by the artificial neural network 500 may indicate a likelihood of anomalous network traffic (e.g., a malicious user).

The artificial neural network 500 may be trained by using training data. Training data may include predefined data modeling expected network interactions between an external network resource 110 and an internal network resource 120. In some embodiments, actual network interaction data may be captured and stored in a database 136 for use as training data. Actual traffic interaction data may be used on an ongoing basis to continually train and improve the artificial neural network 500. By providing training data to the artificial neural network 500, the nodes 516-518 in the hidden layer 504 may be trained (adjusted) such that an optimal output (e.g., a classification) is produced in the output layer 506 based on the training data. By continuously providing different sets of training data, and penalizing the artificial neural network 500 when the output of the artificial neural network 500 is incorrect (e.g., when traffic that has been identified as anomalous is determined to be normal network traffic), the artificial neural network 500 (and specifically, the representations of the nodes in the hidden layer 504) may be trained (adjusted) to improve its performance in data classification. Adjusting the artificial neural network 500 may include adjusting the weights associated with each node in the hidden layer 504.

Figure 6:
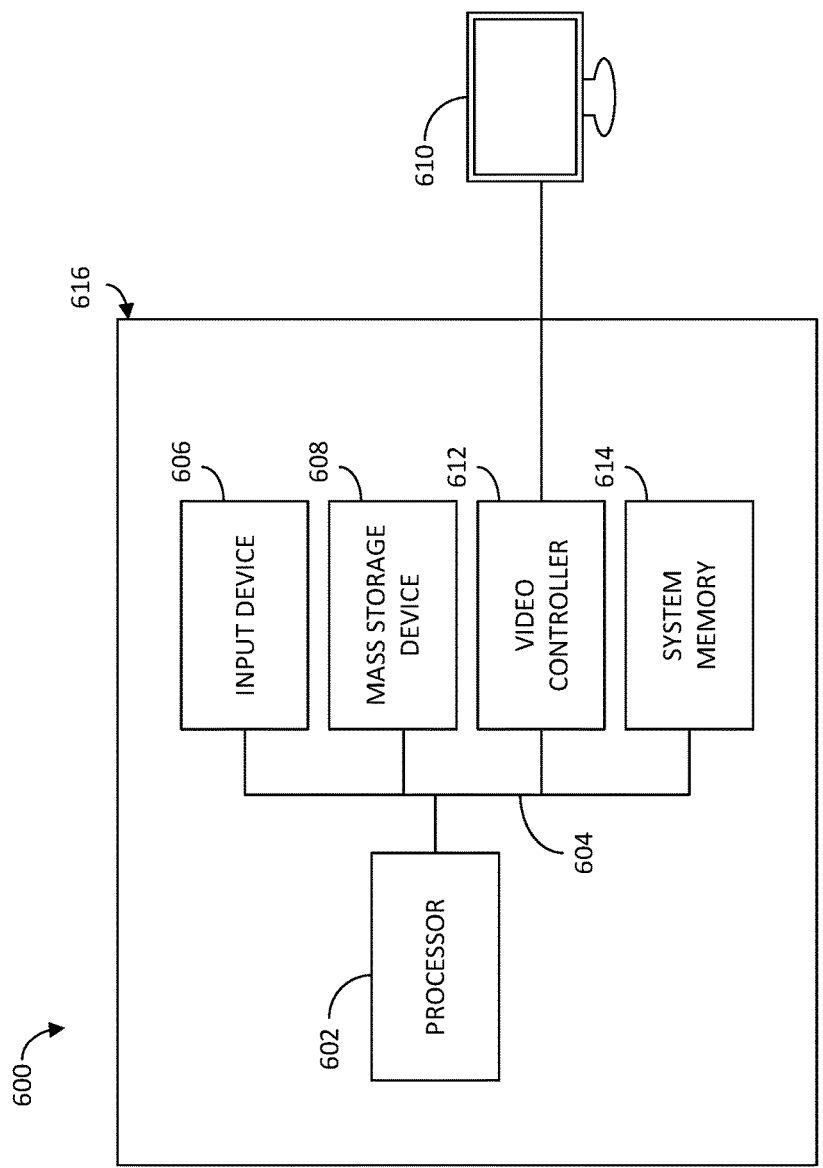
FIG. 6 is a block diagram of a system for implementing a device according to an embodiment of the present disclosure.

FIG. 6 is a block diagram of a computer system 600 suitable for implementing one or more embodiments of the present disclosure, including the anomaly detection server 130, the internal network resource 120, and the external network resource 110. In various implementations, the external network resource 110 may include a mobile cellular phone, personal computer (PC), laptop, wearable computing device, etc. adapted for wireless communication, and each of the anomaly detection server 130, and the internal network resource 120, may include a network computing device, such as a server. Thus, it should be appreciated that the devices 110, 120, and 130 may be implemented as the computer system 600 in a manner as follows.

The computer system 600 includes a processor 602, which is connected to a bus 604. Bus 604 serves as a connection between processor 602 and other components of computer system 600. An input device 606 is coupled to processor 602 to provide input to processor 602. Examples of input devices may include keyboards, touchscreens, pointing devices such as mouses, trackballs, and trackpads, and/or a variety of other input devices known in the art. Programs and data are stored on a mass storage device 608, which is coupled to processor 602. Examples of mass storage devices may include hard discs, optical disks, magneto-optical discs, solid-state storage devices, and/or a variety of other mass storage devices known in the art. computer system 600 further includes a display 610, which is coupled to processor 602 by a video controller 612. A system memory 614 is coupled to processor 602 to provide the processor with fast storage to facilitate execution of computer programs by processor 602. Examples of system memory may include random access memory (RAM) devices such as dynamic RAM (DRAM), synchronous DRAM (SDRAM), solid state memory devices, and/or a variety of other memory devices known in the art. In an embodiment, a chassis 616 houses some or all of the components of computer system 600. It should be understood that other buses and intermediate circuits can be deployed between the components described above and processor 602 to facilitate interconnection between the components and the processor 602.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
a non-transitory memory; and
one or more hardware processors coupled with the non-transitory memory and configured to execute instructions from the non-transitory memory to cause the system to perform operations comprising:
determining, at least in part by comparing first network traffic interactions between a first external network resource and each of one or more internal servers with second network traffic interactions of a plurality of second external network resources and the each of one or more internal servers in a same time window, an external burst score for the first external network resource, the first and second external network resources comprising a network resources of one or more external domains;
determining, at least in part by comparing a frequency of third network traffic interactions between an internal network resource and each of the one or more external domains with a particular interaction frequency, an internal burst score for the internal network resource, the internal network resource a network resource of the one or more internal servers;
creating a burst graph based on the internal burst score and external burst score;
based on the burst graph, determining an interaction pattern between the first or second external network resource and the internal network resource using a graph convolutional neural network; and
determining an anomalous traffic event based on a deviation of the interaction pattern from a probability density function.

2. The system in claim 1, wherein determining the internal burst score comprises:
determining an internal resource interaction probability based on a number of total internal traffic interactions and a number of internal resource interactions,
determining a resource interaction cost based on the internal resource interaction probability, and
determining a difference between a burst state score and a base state score, wherein the burst state score is based on a state transition cost and the internal resource interaction probability, and wherein the base state score is based on the resource interaction cost and the internal resource interaction probability.

3. The system of claim 1, wherein determining the external burst score comprises:
determining a normal external interaction range based on an average number of external resource interactions and an external resource standard deviation, and
determining a difference between a number of external network resource interactions and the normal external interaction range.

4. The system for claim 1, wherein the operations further comprise:
determining one or more external burst scores for each of the one or more external domains; and
determining one or more internal burst scores for each of the one or more internal servers;
wherein creating the burst graph is further based on the one or more external burst scores and the one or more internal burst scores, and wherein the burst graph comprises one or more edges between each of the one or more external domains and each of the one or more internal servers.

5. The system for claim 4, wherein determining the interaction pattern comprises:
determining an embedding for each internal server based on the one or more edges of the burst graph between the internal network resource and each external domain, and
determining an embedding for each external domain based on the one or more edges of the burst graph between the first or second external network resource and each internal server.

6. The system for claim 1, wherein the particular frequency is a usual interaction frequency, and wherein the frequency of third network traffic interactions is compared with the particular frequency in a predefined time window.

7. The system for claim 1, wherein the operations further comprise:
in response to determining the anomalous traffic event, performing a corrective action comprising at least one of: blocking the first or second external network resource from accessing the internal network resource, disabling the internal network resource, limiting connections to the internal network resource, or sending a notification to one or more users.

8. A method comprising:
determining a first external burst score for a first external network resource in a plurality of external network resources, the first external burst score being determined based on comparing first network traffic interactions with second network traffic interactions in a same time period, the first network traffic interactions being conducted between the first external network resource and each internal network resource in a plurality of internal network resources, the second network traffic interactions being conducted between a second external network resource and each internal network resource in the plurality of internal network resources;
determining a first internal burst score for a first internal network resource in the plurality of internal network resources, the first internal burst score being determined based on comparing a predetermined frequency with a frequency of third network traffic interactions between the first internal network resource and each external network resource of the plurality of external network resources;
creating a burst graph based on the first internal burst score and the first external burst score;
based on the burst graph, determining an interaction pattern between the first external network resource and the first internal network resource using a graph convolutional neural network; and
determining an anomalous traffic event based on a deviation of the interaction pattern from a probability density function.

9. The method of claim 8, wherein determining the first internal burst score comprises:
determining an internal resource interaction probability based on a number of total internal traffic interactions and a number of internal resource interactions,
determining a resource interaction cost based on the internal resource interaction probability, and
determining a difference between a burst state score and a base state score, wherein the burst state score is based on a state transition cost and the internal resource interaction probability, and wherein the base state score is based on the resource interaction cost and the internal resource interaction probability.

10. The method of claim 8, wherein determining the first external burst score comprises:
    determining a normal external interaction range based on an average number of external resource interactions and an external resource standard deviation, and
    determining a difference between a number of external network resource interactions and the normal external interaction range.

11. The method of claim 8, further comprising:
    determining a plurality of external burst scores for each of the plurality of external network resources; and
    determining a plurality of internal burst scores for each of the plurality of internal network resources;
    wherein creating the burst graph is further based on the plurality of external burst scores and the plurality of internal burst scores, and wherein the burst graph comprises one or more edges between each of the plurality of external network resources and each of the plurality of internal network resources.

12. The method for claim 11, wherein determining the interaction pattern comprises:
    determining an embedding for each internal network resource based on the one or more edges of the burst graph between the internal network resource and each external network resource in the plurality of external network resources, and
    determining an embedding for each external network resource based on the one or more edges of the burst graph between the first or second external network resource and each internal network resource in the plurality of internal network resources.

13. The method of claim 8, wherein the probability density function comprises a deep gaussian mixture model.

14. The method of claim 8, further comprising:
    in response to determining the anomalous traffic event, performing a corrective action comprising at least one of: blocking the first external network resource from accessing the internal network resource, disabling the first internal network resource, limiting connections to the first internal network resource, or sending a notification to one or more users.

15. A non-transitory machine-readable medium having stored thereon machine-readable instructions executable to cause a machine to perform operations comprising:
    determining external burst scores for each of one or more external network resources, the external burst scores being determined based on comparing multiple different network traffic interactions in a same time frame, the multiple different network traffic interactions corresponding to interactions between different ones of the one or more external network resources and each internal network resource of one or more internal network resources;
    determining internal burst scores for each of one or more internal network resources, the internal burst scores being determined based on comparing a predefined frequency with a frequency of network traffic interactions between the each of the one or more internal network resources and each of the external network resources;
    creating a burst graph based on the internal burst scores and the external burst scores;
    based on the burst graph, determining an interaction pattern between the one or more external network resources and the one or more internal network resources using a graph convolutional neural network; and
    determining an anomalous traffic event based on a deviation of the interaction pattern from a probability density function.

16. The non-transitory machine-readable medium of claim 15, wherein determining the internal burst scores comprises:
    determining an internal resource interaction probability based on a number of total internal traffic interactions and a number of internal resource interactions,
    determining a resource interaction cost based on the internal resource interaction probability, and
    determining a difference between a burst state score and a base state score, wherein the burst state score is based on a state transition cost and the internal resource interaction probability, and wherein the base state score is based on the resource interaction cost and the internal resource interaction probability.

17. The non-transitory machine-readable medium of claim 15, wherein determining the external burst scores comprises:
    determining a normal external interaction range based on an average number of external resource interactions and an external resource standard deviation, and
    determining a difference between a number of external network resource interactions and the normal external interaction range.

18. The non-transitory machine-readable medium of claim 15, wherein the burst graph comprises one or more edges between each of the one or more external network resources and each of the one or more internal network resources.

19. The non-transitory machine-readable medium of claim 18, wherein determining the interaction pattern comprises:
    determining an embedding for each internal network resource based on the one or more edges of the burst graph between the internal network resource and each external network resource, and
    determining an embedding for each external network resource based on the one or more edges of the burst graph between the external network resources and each internal network resource.

20. The non-transitory machine-readable medium of claim 15, wherein the operations further comprise:
    in response to determining the anomalous traffic event, performing a corrective action comprising at least one of: blocking at least one of the one or more external network resources from accessing at least one of the one or more internal network resources, disabling at least one of the internal network resources, limiting connections to at least one of the internal network resources, or sending a notification to one or more users.

* * * * *